United States Patent [19]

Yagawara et al.

[11] Patent Number: 4,947,688
[45] Date of Patent: Aug. 14, 1990

[54] FLOW VELOCITY SENSOR

[75] Inventors: Shinji Yagawara; Wasaburo Ohta, both of Yokohama, Japan

[73] Assignee: Ricoh Company, Ltd., Tokyo, Japan

[21] Appl. No.: 394,415

[22] Filed: Aug. 15, 1989

[30] Foreign Application Priority Data

Aug. 31, 1988 [JP] Japan .................................. 63-216743

[51] Int. Cl.⁵ ................................................ G01F 1/68
[52] U.S. Cl. .................................................. 73/204.26
[58] Field of Search ............. 73/204.16, 204.25, 204.26

[56] References Cited

U.S. PATENT DOCUMENTS 4,343,768  8/1982  Kimura ...................... 73 X/204.26
4,624,137  11/1986  Johnson et al. .................. 73/204.26
4,696,188  9/1987  Higashi ......................... 73 X/204.26

Primary Examiner—Herbert Goldstein
Attorney, Agent, or Firm—Oblon, Spivak, McClelland, Maier & Neustadt

[57] ABSTRACT

A flow velocity sensor comprises a base, a first elongating member extending above the base and defined with a first edge at a downstream end thereof, a first heating device provided on the first elongating member along the first edge, a first heat detector provided on the first elongating member in a vicinity of the first heating device at a side away from the first edge and comprising a first metal oxide which absorbs oxygen when heated, desorbs oxygen when cooled, and changes resistivity responsive to adsorption and desorption of oxygen, a second elongating member extending above the base at a downstream side of the first elongating member and having a second edge at an upstream end thereof such that the second edge is substantially aligned with the first edge in a flow direction, a second heating device provided on the second elongating member along the second edge, and a second heat detector provided on the second elongating member in a vicinity of the second heating device at a side away from the second heating means and comprising a second metal oxide which absorbs oxygen when cooled, desorbs oxygen when heated, and changes resistivity responsive to adsorption and desorption of oxygen.

7 Claims, 2 Drawing Sheets

FLOW VELOCITY SENSOR

BACKGROUND OF THE INVENTION

The present invention generally relates to flow velocity sensors and more particularly to a flow velocity sensor for measuring a velocity of air stream.

Generally, flow velocity sensor for measuring a velocity of fluid such as air in particular detects the velocity by measuring resistance change of a wire or thermistor provided in a stream of the air. Such a resistance change occurs due to a temperature drop of the wire or thermistor, which in turn is caused by the stream of the air removing heat therefrom. However, such a flow velocity sensor is not suited for mass production and there is a problem that the manufacturing cost is high. Further, the flow velocity sensor constructed as such has a problem of slow response.

In order to eliminate these problems, there is proposed a flow velocity sensor using a substrate or base held in the air stream wherein a thin film heater and a pair of thin film heat sensors are carried thereon such that the thin film heat sensors are disposed on both sides of the heater as is disclosed in the Japanese Laid-open Patent Application No.142268/1985. According to this prior art flow velocity sensor, one can obtain a large temperature difference across these pair of sensors for a given air stream velocity while at the same time reducing the electrical power consumption. As a result, the resolution or precision of the measurement of the flow velocity based on the temperature difference is substantially improved. Further, this prior art flow velocity sensor has a relatively quick response and at the same time has a simple structure suited for mass production.

This prior art flow velocity sensor, though having an improved response and resolution, uses permalloy having a temperature coefficient of resistance which is in the order of 3000–4000 ppm/°C. for the heat sensor, and associated therewith, there is a problem in that the response and resolution of the measurement is not sufficient as compared to the quality of measurement which the applicants of the present invention intend to achieve.

Meanwhile, the applicants of the present invention have discovered that certain metal oxides have a temperature coefficient of resistance which is substantially larger than that of permalloy. The present invention is made on the basis of this finding and provides an improved flow rate sensor by using a heat sensor comprising such a metal oxide.

SUMMARY OF THE INVENTION

Accordingly, it is a general object of the present invention to provide a novel and useful flow velocity sensor wherein the aforementioned problems are eliminated on the basis of the aforementioned finding.

Another object of the present invention is to provide an improved flow velocity sensor having an excellent response and resolution, comprising a heater part for generating heat and a heat sensor part for detecting the heat generated by the heater part, both being disposed in a stream of air, wherein a metal oxide exhibiting a large temperature coefficient of resistance by adsorption and desorption of oxygen is used for the heat sensor part.

Another object of the present invention is to provide a compact flow velocity sensor wherein the electrical power consumption is reduced.

Another object of the present invention is to provide a flow velocity sensor comprising a base, a pair of extensions made of electrically insulating material and provided on the base so as to extend in a same direction above the base, a pair of heating elements respectively provided on said pair of extensions and a pair of heat sensors respectively provided on said pair of extensions adjacent to the heating element, wherein the heat sensor comprises a metal oxide which changes its specific resistance responsive to adsorption of oxygen and desorption of oxygen when heated or cooled. According to the present invention, a large resistance change occurs in the metal oxide as a result of adsorption and desorption of oxygen when the heat sensor is subjected to temperature change, whereby the resolution and precision of the velocity reading of the air stream made on the basis of the measurement of temperature change of the heat sensor is significantly improved.

Other objects and further features of the present invention will become apparent from the following detailed description when read in conjunction with attached drawings.

DETAILED DESCRIPTION

Figure 1:
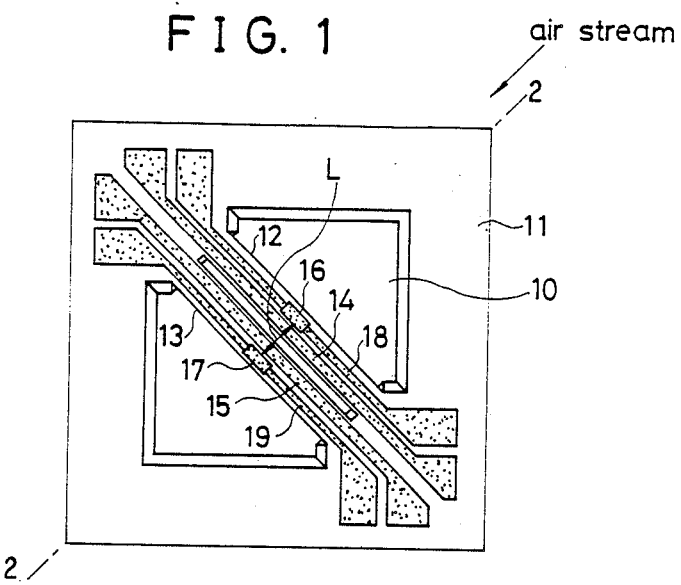
FIG. 1 is a plan view showing a first embodiment of the flow velocity sensor of the present invention.

FIG. 1 shows a flow velocity sensor according to a first embodiment of the present invention in plan view. Referring to FIG. 1, the flow velocity sensor comprises a generally square base 11 which may have a size of 1–4 mm for each edge and a thickness of about 0.1–1 mm. The base 11 is formed with a depression 10 and a pair of extension parts 12 and 13 extend parallel along a diagonal line of the base 11 so as to bridge the depression 10. The base may be made of a material which is easy for undercut etching and deforms little even at high temperatures such as silicon, aluminium, copper, nickel, chromium and the like, wherein silicon is particularly preferred as it has a (100) surface which is easily subjected to undercut etching by well established anisotropic etching process to form the depression 10 while leaving the extension parts 12 and 13 so that the extension parts thus formed bridge across the depression 10.

Figure 2:
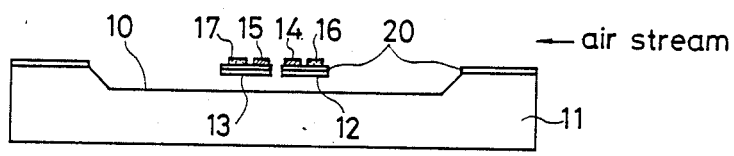
FIG. 2 is a side view showing the flow velocity sensor of FIG. 1.

The extension parts 12 and 13 are covered by an insulating film 20 such as silicon oxide as shown in FIG. 2 which is a cross sectional view taken along a line X—X' in FIG. 1. On the insulating film 20 covering the extension part 12, there is provided a conductor stripe 14 acting as a heater wire and a metal oxide film acting as a heat sensor 16. Further, a connection lead 18 to the heat sensor 16 is also provided on the film 20. Similarly, the insulating film 20 covering the extension part 13 carries another conductor stripe 15 acting as the heater wire, a metal oxide film acting as the heat sensor 17 and a connection lead 19 to the heat sensor 17. As illustrated in FIG. 1, the heat sensors 16 and 17 are aligned in a direction of air stream shown by an arrow and are separated each other by a distance L which may be set to 10–150 μm. The heat sensors 16 and 17 will be described in detail later.

As a material for the conductor stripes 14 and 15 as well as a material for the connection leads 18 and 19, platinum is preferred, wherein the conductor stripes 14 or 15 of platinum are patterned to have a resistance which causes heating of about 150° C. when a current of about a few milliamperes is flowed therethrough. The connection leads 18 and 19 are connected to a Wheatstone bridge (not shown) to detect the difference in the resistance between the metal oxide film of the heat sensor 16 and the metal oxide film of the heat sensor 17. The Wheatstone bridge is adjusted such that no output occur when there is no stream of air.

In operation, the flow velocity sensor is disposed in an air stream such that the heat sensor 16 on the extension part 12 and the heat sensor 17 on the extension part 13 are aligned in the direction of the air stream. In the illustrated example, the air stream flows diagonally from an upper right corner to a lower left corner of the base 11. Note that the heat sensor 16 and the heat sensor 17 are aligned on the diagonal line of the base 11. Further, the conductor stripes or heater wires 14 and 15 are heated to about 150° C. as already described. The heater wires 14 and 15 are disposed between the heat sensors 16 and 17.

When the air stream passes over the flow velocity sensor thus constructed, the upstream side heat sensor 16 is cooled by the air stream while the downstream side heat sensor 17 is warmed by the heat transported from the conductor stripes or heater wires 14 and 15 by the air stream. Responsive thereto, the resistance of the heater wires is changed and an output is obtained from the Wheatstone bridge. For example, there appears a temperature difference of about 50° C. between the heat sensors 16 and 17 when an air stream of about 1000 cm/sec is applied to the flow velocity sensor of FIG. 1. When a current of about 1 mA is passed through the Wheatstone bridge, an output voltage of about 1 volt can be obtained without amplification.

In the flow velocity sensor of FIG. 1 wherein the extension parts 12 and 13 extend perpendicularly to the flow of the air stream, undesirable effect of heat transported to the heat sensors 16 and 17 from a part of the conductor stripes 14 and 15 not immediately adjacent to the heat sensors on the diagonal line X—X' but deviated laterally therefrom is minimized and the precision or reliability of measurement is improved.

Next, the metal oxide film used in the present invention for the heat sensors 16 and 17 having a very large temperature coefficient of resistance will now be described. The heat sensors comprising the metal oxide film constitutes an essential part of the flow velocity sensor of the present invention. Note that the metal oxide used for the heat sensor in the flow velocity sensor of the present invention is deposited on the insulating film 20 in a form of thin film.

In the flow velocity sensor of FIG. 1, a tin oxide ($SnO_2$) film is used as the heat sensors 16 and 17. The thin film of tin oxide may be deposited by using a vacuum evaporation apparatus proposed by one of the applicants of the present invention in the Laid-open Japanese Patent Application No. 89763/1984 under an oxygen partial pressure of 0.5 Pa and a deposition rate of 5–15 Å/sec until the film has a thickness of 0.05–3 μm.

Figure 3:
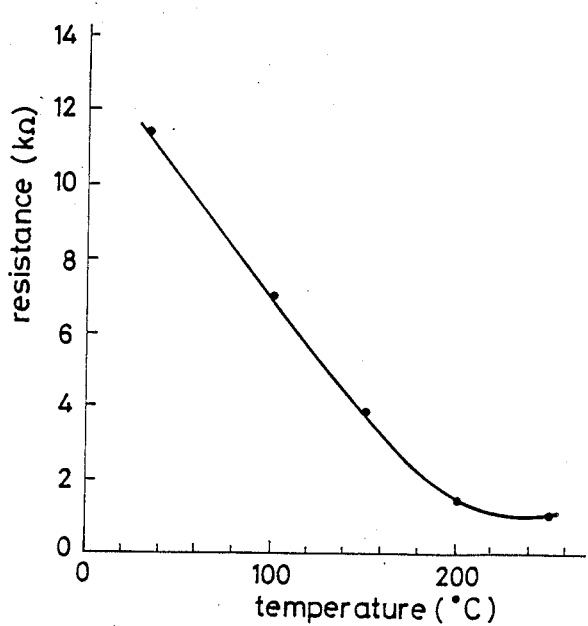
FIG. 3 is a graph showing a temperature versus resistance characteristic of tin oxide film used in the flow velocity sensor of FIG. 1 as a heat sensor.

FIG. 3 shows a temperature versus resistance curve which was found for the tin oxide film thus deposited. It should be noted that the characteristic curve is generally straight except for a temperature region exceeding about 200° C. and there is a resistance change of about 10 percent between the room temperature and 200° C. This temperature change indicates a temperature coefficient of resistance of about 40000–50000 ppm/°C. which is ten times larger than that of permalloy. By using the tin oxide film as the heat sensors 16 and 17, one can achieve a significantly improved performance such as response and resolution in the flow velocity sensor.

The reason of this unexpectedly large temperature coefficient is attributed to the adsorption and desorption of oxygen on and from the tin oxide occurring when the temperature of the oxide is changed. Thus, oxygen is adsorbed when the temperature is lowered and is desorbed when the temperature is raised. When oxygen is adsorbed on the tin oxide film, electron acting as carrier in the oxide film is trapped by oxygen and the resistance of the film is increased. On the other hand, when oxygen is desorbed, electron is released and the resistance of the film is decreased. Such a resistance change caused by the adsorption and desorption of oxygen is not limited to tin oxide but occurs also in other materials such as zinc oxide, iron oxide, titanium oxide, indium oxide, nickel oxide, tungsten oxide, cadmium oxide, and the like. Further, the method of depositing these materials on the insulating film 20 on the extension parts 12 and 13 is not limited to the method described before but other methods such as sputtering or vacuum deposition can also be used. Furthermore, the material for the heat sensor 16 and the material for the heat sensor 17 are not necessarily be identical. Thus, one may choose tin oxide for the heat sensor 16 and other metal oxide such as zinc oxide for the heat sensor 17.

Figure 4:
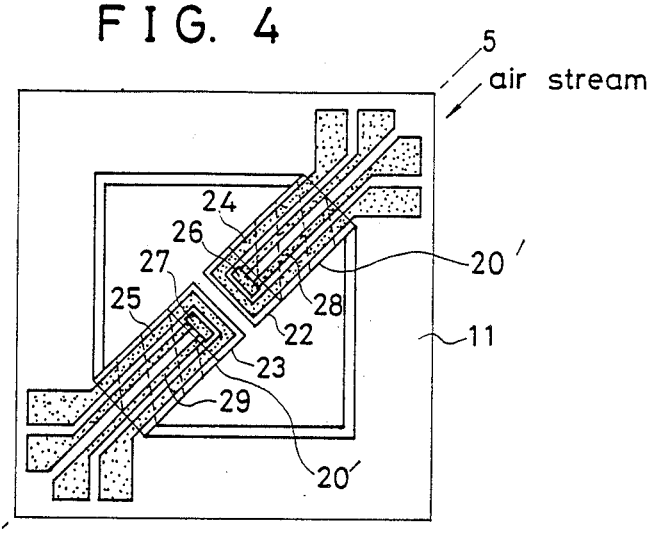
FIG. 4 is a plan view showing a second embodiment of the flow velocity sensor of the present invention.
Figure 5:
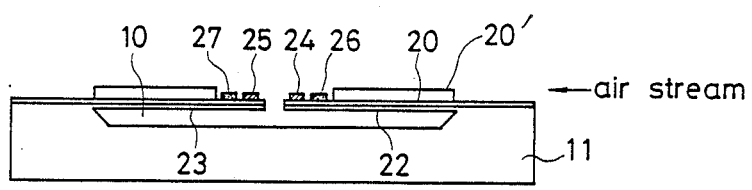
FIG. 5 is a side view showing the flow velocity sensor of FIG. 4.

FIGS. 4 and 5 show a second embodiment of the flow velocity sensor of the present invention in which FIG. 4 shows a plan view and FIG. 5 shows a side view taken along an X—X' line in FIG. 4. In the drawings, the parts constructed identically to those corresponding parts in FIGS. 1 and 2 are given identical reference numerals and the description thereof will be omitted.

In this embodiment, a pair of arms 22 and 24 are formed by the undercut etching of the depression 10 so as to extend diagonally along the direction of air stream. Thus, the arm 22 and arm 23 are opposed each other at a central part of the diagonal line. Further, a conductor stripe 24 of platinum and acting as a heater wire is deposited along an outer margin of the arm 23 and a heat sensor 26 of tin oxide is deposited immediately inside the conductor stripe 24 at a tip end portion of the arm 22. Furthermore, a pair of leads 28 to the heat sensor 26 extend immediately inside the heater wire 24. Similarly, another conductor stripe 25 of platinum acting as the heater wire is deposited along an outer margin of the arm 23 and a heat sensor 27 of tin oxide is deposited immediately inside the conductor pattern 25 at a tip end portion of the arm 24. Furthermore, a pair of leads 29 to the heat sensor 27 extend immediately inside the heater wire 25.

In this structure, too, the heat sensor 27 is at the downstream side of the heat sensor 26 and is heated when there is an air stream flowing in a direction indicated in the drawings by the arrow. Similarly to the preceding embodiment, it is preferred to set the distance between the pair of heat sensors to 10–500 μm.

Further, there is provided an insulator layer 20' such as silica or alumina on the arms 22 and 23 so as to cover a region of the conductor stripes 24 and 25 which is not immediately adjacent to the heat sensor 26 or 27. Thus, the unwanted heating of the sensor 26 by the heat transported thereto from the upstream region of the conductor stripe 24 when the air stream flows over the exposed conductor stripe 24, is eliminated and the precision of measurement is improved. The same holds true for the insulator layer 20' covering the region of the heater wire 25 when the air flows in a reversed direction.

The flow velocity sensor thus constructed has an advantage in that the extension parts 22 and 23 extending along the direction of the air stream does not disturb the flow of air stream. Further, the effect of heat from the region or part of the conductor stripes 24 and 25 not immediately adjacent to the heat sensors 26 and 27 is minimized by the insulator layer 20' covering the conductor stripes.

Further, the present invention is not limited to these embodiments but various variations and modifications may be made without departing from the scope of the present invention.

What is claimed is:

1. A flow velocity sensor for measuring a flow velocity of a fluid, comprising:
    a base disposed in a flow of said fluid flowing in a predetermined flow direction;
    a first elongating member connected to and extending above the base in the flow of said fluid, said first elongating member being defined with at least a first edge at a downstream end thereof;
    first heating means provided on the first elongating member at least along said first edge for generating heat;
    first heat detecting means provided on the first elongating member in a vicinity of the first heating means at a side away from the first edge, said first heat detecting means comprising a first metal oxide which absorbs oxygen when heated, desorbs oxygen when cooled, and changes resistivity responsive to absorption and desorption of oxygen;
    a second elongating member connected to and extending above the base in the flow of said fluid at a downstream side of the first elongating member, said second elongating member at least having a second edge at an upstream end thereof, said second edge being substantially aligned with said first edge in the predetermined flow direction at a downstream side of the first edge;
    second heating means provided on the second elongating member at least along the second edge; and
    second heat detecting means provided on the second elongating member in a vicinity of the second heating means at a side away from the second heating means, said second elongating member comprising a second metal oxide which adsorbs oxygen when cooled, desorbs oxygen when heated, and changes resistivity responsive to adsorption and desorption of oxygen.

2. A flow velocity sensor as claimed in claim 1 in which said first and second, metal oxides are chosen from a group of consisting tin oxide, zinc oxide, iron oxide, titanium oxide, indium oxide, nickel oxide, tungsten oxide, and cadmium oxide.

3. A flow velocity sensor as claimed in claim 1 in which said first and second metal oxide comprises tin oxide.

4. A flow velocity sensor as claimed in claim 1 in which said first and second heat detecting means comprise a thin film of tin oxide having a thickness in a range of 0.05–3 μm.

5. A flow velocity sensor as claimed in claim 1 in which said base comprises a generally square silicon substrate formed with a depression, said first and second elongating members extend parallel and diagonally along a first diagonal line of the substrate perpendicularly to said predetermined flow direction so as to bridge the depression, said first heat detecting means and said second heat detecting means are substantially aligned along a second diagonal line parallel to said predetermined flow direction, and said first and second heat detecting means are separated by about 10–150 μm.

6. A flow velocity sensor as claimed in claim 1 in which said base comprises a generally square substrate defined with a depression, said substrate having an upstream corner and a down stream corner aligned on a diagonal line of the substrate extending along the predetermined flow direction, said first and second elongating members extend along the diagonal line respectively from the upstream corner up to the downstream end defined by the first edge and from the downstream corner up to the upstream end defined by the second edge, said first heating means comprises a conductor stripe which in turn comprises a first part extending from the upstream corner to the first edge of the first elongating member, a second part extending along the first edge and a third part extending from the first edge to the upstream corner, said second heating means comprises a conductor stripe which in turn comprises a first part extending from the downstream corner to the second edge of the second elongating member, a second part extending along the second edge and a third part extending from the second edge to the downstream corner, wherein said first part and second part of the first heating means and said first part and second part of the second heating means are covered by an insulating layer.

7. A flow velocity sensor as claimed in claim 1 in which said base comprises silicon, said first and second elongating members comprise a base member forming a part of the base and an insulating film deposited for covering the base member.

* * * * *